(12) United States Patent
Meschenmoser et al.

(10) Patent No.: US 9,738,040 B2
(45) Date of Patent: Aug. 22, 2017

(54) METHOD OF MAKING A SPECTACLE LENS

(71) Applicant: Carl Zeiss Vision International GmbH, Aalen (DE)

(72) Inventors: Ralf Meschenmoser, Essingen (DE); Norbert Kurz, Aalen (DE); Malte Riedel, Aalen (DE); Stephan Duewel, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 318 days.

(21) Appl. No.: 14/530,465

(22) Filed: Oct. 31, 2014

(65) Prior Publication Data

US 2015/0115486 A1    Apr. 30, 2015

(30) Foreign Application Priority Data

Oct. 31, 2013 (DE) ................ 10 2013 222 232

(51) Int. Cl.
*B29D 11/00* (2006.01)
*B29C 45/00* (2006.01)
*B29L 11/00* (2006.01)

(52) U.S. Cl.
CPC .... *B29D 11/00009* (2013.01); *B29C 45/0055* (2013.01); *B29D 11/00538* (2013.01); *B29D 11/00548* (2013.01); *B29L 2011/0016* (2013.01)

(58) Field of Classification Search
CPC ........ B29D 11/00009; B29D 11/00538; B29D 11/00548; B29C 45/0055; B29L 2011/0016
See application file for complete search history.

(56) References Cited

U.S. PATENT DOCUMENTS

| 6,158,966 A * | 12/2000 | Guespin ................. G05D 7/03 417/46 |
| 2009/0179339 A1* | 7/2009 | Katzman ............. B29C 33/0038 264/1.32 |
| 2011/0018150 A1 | 1/2011 | Silver |

FOREIGN PATENT DOCUMENTS

| DE | 10 2009 004 377 A1 | 7/2010 |
| DE | 10 2009 004 379 A1 | 7/2010 |
| WO | 2011/110300 A2 | 9/2011 |
| WO | WO 2011/110300 * | 9/2011 |

* cited by examiner

*Primary Examiner* — Mathieu Vargot
(74) *Attorney, Agent, or Firm* — Walter Ottesen, P.A.

(57) ABSTRACT

A method for making a spectacle lens includes joining a mold and a sealing ring. The mold has an integrated block piece and a mold shell made by primary shaping and the sealing ring has a first end face, a second end face, a peripheral seal, an opening disposed on the first end face configured to receive a mold, and a flexible membrane on the second end face. A polymerizable material is introduced into the mold cavity with the aid of a pump action of the flexible membrane of the sealing ring. The flexible membrane of the sealing ring is fixed in a desired surface shape and the polymerization is carried out. The mold is removed with a cast-on spectacle lens blank.

18 Claims, 18 Drawing Sheets

METHOD OF MAKING A SPECTACLE LENS

CROSS REFERENCE TO RELATED APPLICATION

This application claims priority of German patent application no. 10 2013 222 232.7, filed Oct. 31, 2013, the entire content of which is incorporated herein by reference.

FIELD OF THE INVENTION

The invention relates to a mold for producing a spectacle lens, with an integrated block piece and a mold shell. The invention further relates to a sealing ring for such a mold, an arrangement made of a mold according to the invention and to a sealing ring according to the invention, a method for producing a mold according to the invention, and a method for producing spectacle lenses.

BACKGROUND OF THE INVENTION

In the production of a spectacle lens, a blank is generally first of all cast from a suitable plastic and, in a second manufacturing step called the prescription lens manufacture, is brought to the final shape to achieve the prescription values. The prescription lens manufacture involves work to remove material. To minimize the necessary stock of blanks, these blanks are generally made available only in rough gradations as regards diameter and curvature of the front and back surfaces. Therefore, in the prescription lens manufacture, it is generally necessary to remove a considerable amount of material, usually with about 70% by weight of the material of the blank being removed and discarded. Recycling of this material is not possible.

To machine the blank in the prescription lens manufacture, a block piece has to be attached to the blank, via which the blank can be retained for working in a suitable machine tool. To mount the blank on the block piece, a low-melting metal alloy is generally used. Only a small surface area of the blank is generally blocked, since the heavy-metal alloys used are very expensive and, what is more, very elaborate cleaning of the waste water is necessary in order to avoid contamination thereof with heavy metals. During the machining, the protruding lens edges tend to experience undesired oscillations or to yield and fracture. The oscillation can result in a surface having an undesired structure, and the latter cannot be polished out, since oscillation and yielding of the lens edge also occur during the polishing. Moreover, the outer area is pressed downward during the machining and snaps back again after the loading, as a result of which a kind of bead can form on the unmachined back surface.

It has already been proposed (WO 2011/110300 A2), in a conventional mold, to provide a mold shell with an integrated block piece. After the casting, the blank remains adhering with a surface (the front surface or back surface) to this mold shell and, by means of the integrated block piece, can be machined in the prescription lens manufacture (on the opposite surface).

United States patent application publication 2011/0018150 A1 discloses a method for producing a spectacle lens, in which method the as yet unpolymerized resin is introduced into a mold, the front and rear faces of which are flexible and transparent. The document proposes that the as yet uncured resin is shaped, in front of the eye of the future wearer of the spectacles, via the flexible faces, such that a lens with the desired correction values is obtained. It appears doubtful whether such a method is practicable.

United States patent application publication 2009/0179339 discloses a mold and a sealing ring for producing a spectacle lens.

SUMMARY OF THE INVENTION

It is an object of the invention to simply and inexpensively produce spectacle lenses that are individually adapted to a spectacles wearer.

According to a first aspect of the invention, this object is achieved by a method for producing a spectacle lens, characterized by the following steps:
a) joining together
  i. a mold (1) with an integrated block piece (13) and a mold shell (11) produced by primary shaping,
  ii. and a sealing ring, which has a peripheral seal (21), on a first side an opening for receiving a mold, and on the second side a flexible membrane (22),
  to form a mold cavity,
b) introducing a polymerizable material into the mold cavity (3) with the aid of a pump action of the flexible membrane (22) of the sealing ring (2),
c) fixing the flexible membrane (22) of the sealing ring (2) in the desired surface shape,
d) carrying out the polymerization,
e) removing the mold (1), with the cast-on spectacle lens blank, from the sealing ring (2).

Optionally, any necessary finishing steps, in particular prescription grinding, can additionally be carried out for producing the finished spectacle lens.

Suitable materials for the sealing ring and flexible membrane are rubbers and polymers, for example.

Some terms used in the context of the invention will be explained first of all.

A mold is used to cast at least one surface (front or back surface) of a spectacle lens from a polymerizable material (monomer). It has a mold shell (generally either a front or back surface mold shell), which has a so-called optical surface. The optical surface is the mating surface for the front or back surface of the blank cast in such a mold.

The mold has an integrated block piece. Integrated means that it is connected (preferably integrally) to the mold. The block piece serves for the temporary connection of the mold (with the casting (or blank) adhering thereto) to a machine tool.

According to the invention, the mold shell is produced by primary shaping. This means that at least the area of the mold forming the optical surface (mating surface for the cast surface) is produced by material build-up via primary shaping.

According to DIN 8580, primary shaping designates all manufacturing methods in which a solid body is produced from a formless substance. The shape of a geometrically defined, solid body is thus produced and the substance is held together. The starting materials used can be liquid, plastic, granular or powdery.

A preferred subgroup of primary shaping within the context of the invention is injection molding. In this method, a polymer (generally in the form of granules) is plasticized and injected into an injection molding tool. The cavity of the latter defines the shape and surface structure of the finished part.

It is likewise possible, within the context of the invention, to carry out 3D printing as a variant of the primary shaping. 3D printing is an additive production method in which the desired shape is produced exclusively by application of material. A preferred 3D printing method is fused deposition modelling (FDM), in which preferably a thermoplastic material is applied from a nozzle in a string shape in order to form the desired structure. Suitable thermoplastics may be ABS, PC, PLA, HDPE and PPSU, for example. Since the mold is preferably used as a disposable mold for producing just a single spectacle lens, biodegradable plastics can preferably be used. It is likewise possible, within the context of the invention, for 3D printing to be carried out using photopolymerizable plastics, in particular UV-curable plastics.

The spectacle lens is produced by casting. To form a mold cavity, the mold cooperates with a sealing ring.

Together with the mold, the sealing ring forms a mold cavity into which polymerizable material is introduced for the production of a blank. This can be a known polymerizable material used for the production of spectacle lenses, for example CR-39® (polyallyl diglycol carbonate (PDAC)), CR-607® and Trivex® (nitrogen-modified polyurethane) from PPG Industries and also the MR series (thiourethane polymers) from Mitsui Chemicals. Suitable polymerizable compositions are familiar to a person skilled in the art.

The flexible membrane of the sealing ring is fixed in the desired surface shape and the polymerization is carried out. The mold, with the cast-on blank, is removed from the sealing ring. Any necessary finishing work is then carried out, in particular prescription machining (prescription grinding) for the production of the finished spectacle lens.

The introduction of the polymerizable material into the mold cavity is effected with the aid of the pump action of the flexible membrane of the sealing ring. The flexible membrane of the sealing ring is fixed in the desired surface shape preferably by a shaping element, more preferably a spring clamp element. Any necessary finishing steps are preferably at least partially carried out, with the spectacle lens blank remaining on the mold, using the integrated block piece.

Preferably, the blank is produced with a surface allowance of 10 mm or less, more preferably 5 mm or less, more preferably 0.2 to 5 mm. According to the invention, the material removed in the finishing work can be small, amounting preferably to 20% by weight or less, more preferably 10% by weight or less.

The peripheral seal forms the edge areas of the mold cavity and is therefore circular in order to cast a circular blank. The peripheral seal cooperates sealingly with the edges of the mold; here, sealingly means that the leaktightness is sufficient to prevent escape of polymerizable material from the mold cavity. The peripheral seal can be made flexible, in such a way that it is able to cooperate with differently shaped molds. These do not necessarily have to be circular; instead, their edge can be adapted from the outset to the desired final shape of the spectacle lens.

On one face, the sealing ring has an opening for receiving a mold. It is generally completely open on this face, such that the peripheral seal sealingly encloses the edge of an inserted mold. It has a flexible membrane on the second face. This flexible membrane forms the limit of the mold cavity on this face.

The mold, with a mold shell individually shaped by 3D printing, permits the casting of a spectacle lens blank with a finished and individually adapted front surface or back surface. Further working of the blank, in particular the prescription grinding on the opposite surface, can take place using the mold as block piece. During the entire manufacture of the spectacle lens, the cast finished surface therefore remains protected, and subsequent application of a block piece for the prescription grinding is dispensed with. The whole of the cast surface is completely protected all the way through the manufacturing process.

After the casting process, cast blanks have to be tempered without stress in the course of cooling. In the prior art, this is generally done by mounting the semifinished products on lens plates, with the concave surface facing downwards. During the tempering, deformations can occur at the elevated temperature. By contrast, according to the invention, the tempering of the blank can take place with the mold still blocked. The blank is fully supported, and deformation cannot take place.

By virtue of the individual manufacture and the one-off use of a mold produced by 3D printing, it is possible for the cast surface to be adapted from the outset to the individual requirements of a spectacles wearer. This entails several aspects and advantages.

In the prior art, the molds are generally used a number of times, such that individualization of the cast surfaces is not possible or, at best, is possible to a very limited extent. This means that a considerable loss of material of 70% or more generally occurs in the subsequent prescription manufacture. An individually produced mold can be adapted from the outset to the future spectacles wearer in terms of diameter, edge shape, the form of the cast surface and the thickness of the blank, such that only a small amount of material is removed in the subsequent machining (prescription grinding).

The surface cast using the mold can be the back surface or preferably the front surface of a spectacle lens. It can in particular be made concave or convex and can have single-vision or multifocal power. The surface can, for example, be spherical, aspherical, toric, atoric, bifocal, trifocal or can be designed as a progressive surface.

The mold shell and optical surface of the mold can in particular be designed for casting a finished spectacle lens surface, it being possible for the latter to be a prescription surface which includes some or all of the prescription powers provided for the spectacles wearer. For example, if a front surface with a progressive power is cast, this can in principle be a standard progressive surface without adaptation to an individual user. However, in the context of the invention, it is preferable if such a progressive surface is designed as an individual progressive surface in which the progressive power and/or the arrangement and profile of the intermediate corridor are adapted from the outset to the intended spectacles wearer.

A further advantage of the invention is the possibility of providing the cast surface of the spectacle lens with different coatings in the course of the casting process. For this purpose, wet chemical coatings are preferably applied to the optical surface of the mold shell, which coatings are transferred to the corresponding spectacle lens surface during casting. The application of wet chemical coatings to the optical surface can preferably be done by suitable techniques, for example spin coating technology. For example, such coatings can have the following functions, which are listed from the outside inwards (from the point of view of the finished spectacle lens):

- anti-fog layer (for example, nanoparticles)
- anti-static coating
- hydrophobic layer
- anti-reflective coating
- polarization layer
- photochromic layer
- adhesive for improving adhesion to the material of the spectacle lens.

The sealing ring cooperates with a mold to form a mold cavity. Therefore, in contrast to the prior art, the invention requires only one mold, of which the optical surface is used to cast a spectacle lens surface. According to the invention, the opposite surface of the spectacle lens is cast using the flexible membrane of the sealing ring as a shaping element.

The shaping element provided for the flexible membrane of the sealing ring is preferably configured as a spring clamp element. With this shaping element, the membrane can be brought to the desired basic shape (generally convex or concave). The shaping, for example by a spring clamp element, is sufficiently precise to ensure that only a small material allowance of preferably between 0.2 and 5 mm is present over the form of the intended final surface (generally a prescription surface), which material allowance still has to be removed in the course of the prescription manufacture.

The shaping element is preferably elastic, for example a spring clamp element, such that changes in volume that take place during the polymerization, in particular shrinkage, can be automatically compensated during the polymerization.

The surface of the spectacle lens shaped by the flexible membrane generally has to be reworked in the context of the prescription manufacture, in order to achieve the desired prescription powers. However, as has been described above, at least some of the desired prescription powers can be obtained by way of the optical surface of the mold shaped individually by 3D printing.

The sealing ring preferably has, in the area of the peripheral seal, at least two inlet/outlet channels for casting composition. These inlet/outlet channels are preferably arranged pointing radially outwards on the circumference, more preferably lying more or less diametrically opposite each other, and they are more preferably arranged closely adjacent to that edge area of the circumference that faces towards the flexible membrane.

During the casting of a spectacle lens blank, the liquid resin has to be introduced into the mold. Since air bubbles present in the resin have a tendency to adhere to inside walls of the mold, in particular to walls of the sealing ring, it is difficult to fully displace the air and, in particular, to ensure no air inclusions in the edge area. In the described aspect of the invention, at least two channels are present, such that filling can take place through one channel while the enclosed air escapes through the second channel. This makes it much easier to fill the mold in a manner free of bubbles. Of particular advantage in this context is the flexible membrane of the sealing ring, which serves as a pump element for the filling process. For example, if the membrane is moved axially away from the mold via an underpressure, this has the effect of sucking in casting composition. If, after this suctioning, the membrane is moved axially back in the opposite direction, for example by an overpressure, excess casting composition and any air bubbles that are present are forced out. The inlet/outlet channels can preferably be made flexible and, as a result, can be clamped or pressed shut. After the arrangement made of mold and sealing ring has been filled, this allows the mold cavity to be easily closed prior to the polymerization.

It is of particular advantage that, according to the invention, the inlet/outlet channels can be made to take up very little space and need only little room in the axial direction. According to the invention, an arrangement composed of mold and sealing ring can be used to cast lenses with very thin edge heights (these are needed in particular in plus-power lenses), where only a very small amount of material has to be removed in the course of the subsequent machining. According to the invention, it is possible, for example in any lens shapes, that is, including the described plus-power lenses with low edge heights, to provide the surface of the spectacle lens cast by the flexible membrane with only a very small surface allowance, which can lie between 0.2 and 5 mm, for example. Values of 0.2-3 mm, more preferably 0.2-1.5 mm, more preferably 0.2-1 mm are preferred. Accordingly, in the subsequent prescription manufacture, only a very small amount of material is removed. A particular advantage of the invention is also that, after the casting, very thin blanks can be tempered free of stress and without deformations, since during this process they are still supported by the mold across their whole surface. By contrast, in the prior art, in which the lenses are generally mounted only on the edge of the concave surface for stress-free tempering, undesired deformations increasingly occur specifically in thin lenses, which deformations often have to be corrected again, at some cost, by further machining during the prescription manufacture.

The sealing ring can be designed to receive a mold in different positions, in such a way that mold cavities with different edge heights are obtained. The mold can, for example, be inserted to different depths into the peripheral seal. An arrangement composed of mold and sealing ring can thus be used variably for different edge heights of blanks, preferably for example for edge heights of 1 to 20 mm. According to the invention, the mean thicknesses of lenses can thus likewise be varied in a simple way, with preferred mean thicknesses lying, for example, between 1 and 20 mm. The possibility, according to the invention, of casting lenses with small mean thicknesses permits the manufacture of strong minus-power lenses, which have very little surface allowance and accordingly require little material to be removed in subsequent working.

Provision can be made that a sealing ring has, on the inner circumference of the peripheral seal, means for fixing a mold in at least one defined depth dimension. For example, these means can be in the form of a step on the inner circumference, on which step the edge of the mold abuts, thereby bringing mold and sealing ring into a defined axial position relative to each other. If appropriate, it is also possible for several steps to be provided on the inner circumference, in order to permit fixing with different depth dimensions. The sealing ring can additionally have an insertion bevel, in order to make joining to a mold easier.

According to the invention, blanks can be produced individually in a broad range of dimensions and curvatures. For example, the base curves of the cast surfaces can be plane or curved (preferably convex) with radii of preferably up to 30 mm. If blanks with a circular circumferential shape are initially to be produced, the diameters according to the invention can lie, for example, between 40 and 100 mm. Reasonable and sufficiently small gradations of the diameter can be provided, such that the final spectacle lens can be produced expediently and with a small amount of material being removed at the edge. The gradations in diameter can be 5 mm, for example, while reasonable diameter steps can be, for example, 58, 63, 68, 73 and 78 mm, etc.

In the production of a mold, the surface design of the mold shell can be established in a first step. Although this can be a standard design, it is preferably an at least partially individually adapted design, where the individually adapted aspects can be, for example, the diameter or shape of the lens, the curvature of the cast surface, or individual prescription values such as, for example, a progressive surface with predefined progressive value and profile of the intermediate corridor. The surface design thereby established is transferred to a 3D printer. In the next step, at least the mold shell with its optical surface, or preferably the entire mold, is produced by 3D printing. To produce this mold, which is to be used only once, a biodegradable plastic can be used, which makes it easier to dispose of the mold after it has been used.

The optical surface of the mold can additionally be polished and/or provided with at least one wet chemical coating, which is designed for transfer to the cast surface of the blank or of the casting. Possible and preferred coatings have already been described above. A mold can be produced by 3D printing with a lead time of a few hours and then delivered for the casting process. Since the mold is preferably used just once, it is possible to avoid the disturbances on the optical surface of the mold that are customary in multiple uses (caused, for example, by contaminants or the like in multiple use).

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
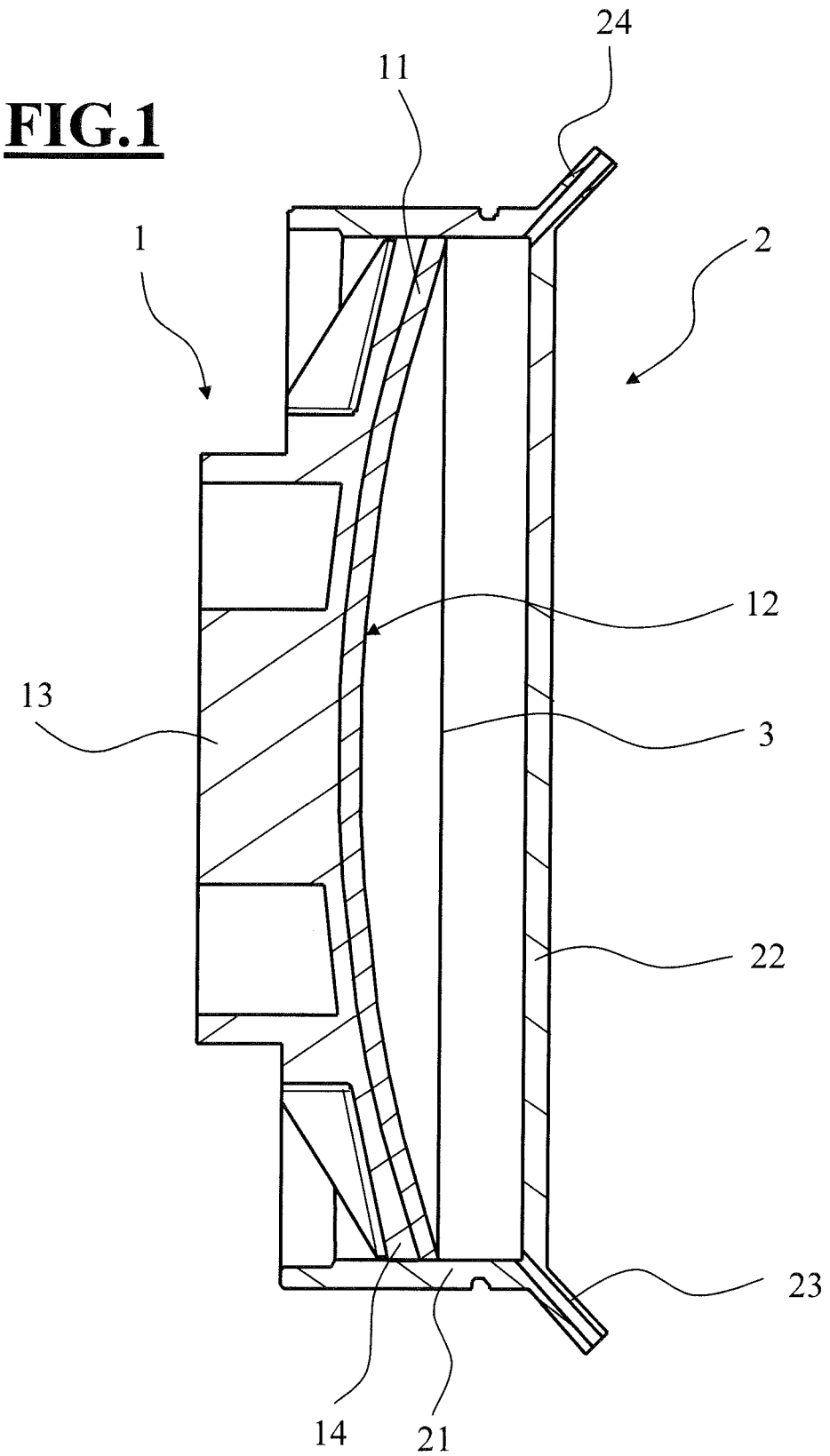
FIG. 1 shows an arrangement with a concave mold in cross section.

FIG. 1 shows, in cross section, a mold 1 inserted into a sealing ring 2.

The mold 1 has a mold shell 11, which has a mold surface, or optical surface 12, designed for casting a blank. In the illustrative embodiment shown, this optical surface 12 is concave; it can, for example, be a spherical surface or a rotationally symmetrical aspherical surface.

The mold 1 and in particular the mold shell 11 with the optical surface 12 are produced by 3D printing. The optical surface 12 has a shape and surface condition which, during the casting process, define a surface of a spectacle lens which, without further working, has a sufficient optical quality. By production by 3D printing, this surface can in particular be adapted individually to the intended user and, for example, can already have prescription values.

The mold 1 has a block piece 13 which serves to connect the mold 1, and a blank cast thereon, to machining tools for further working of the blank to give the finished spectacle lens.

The optical surface 12 is provided with wet chemical coatings, as are described in detail above.

The mold 1 is inserted with its peripheral edge 14 into the peripheral seal 21 of the sealing ring 2 and is enclosed sealingly by this peripheral seal 21. The sealing ring 2 has a flexible membrane 22; in the area of the transition of the flexible membrane 22 into the peripheral seal 21, two inlet/outlet channels (23, 24) are located at two diametrically opposite positions on the periphery. The two channels (23, 24) are likewise made from flexible material and can thus be closed by squeezing them. The mold 1 can be inserted to different depths into the peripheral seal 21 of the sealing ring 2, in order thereby to cast blanks with different edge heights. The mold shell 11 and the sealing ring 2 with the peripheral seal 21 and the flexible membrane 22 together enclose a mold cavity 3.

In order to cast a blank, the mold cavity 3 is filled with monomer (polymerizable composition). The filling takes place via one of the channels (23, 24), and the air is preferably allowed to escape from the mold cavity 3 via the respective other channel. To make filling easier, the outer face of the flexible membrane 22 is subjected to underpressure.

Figure 2:
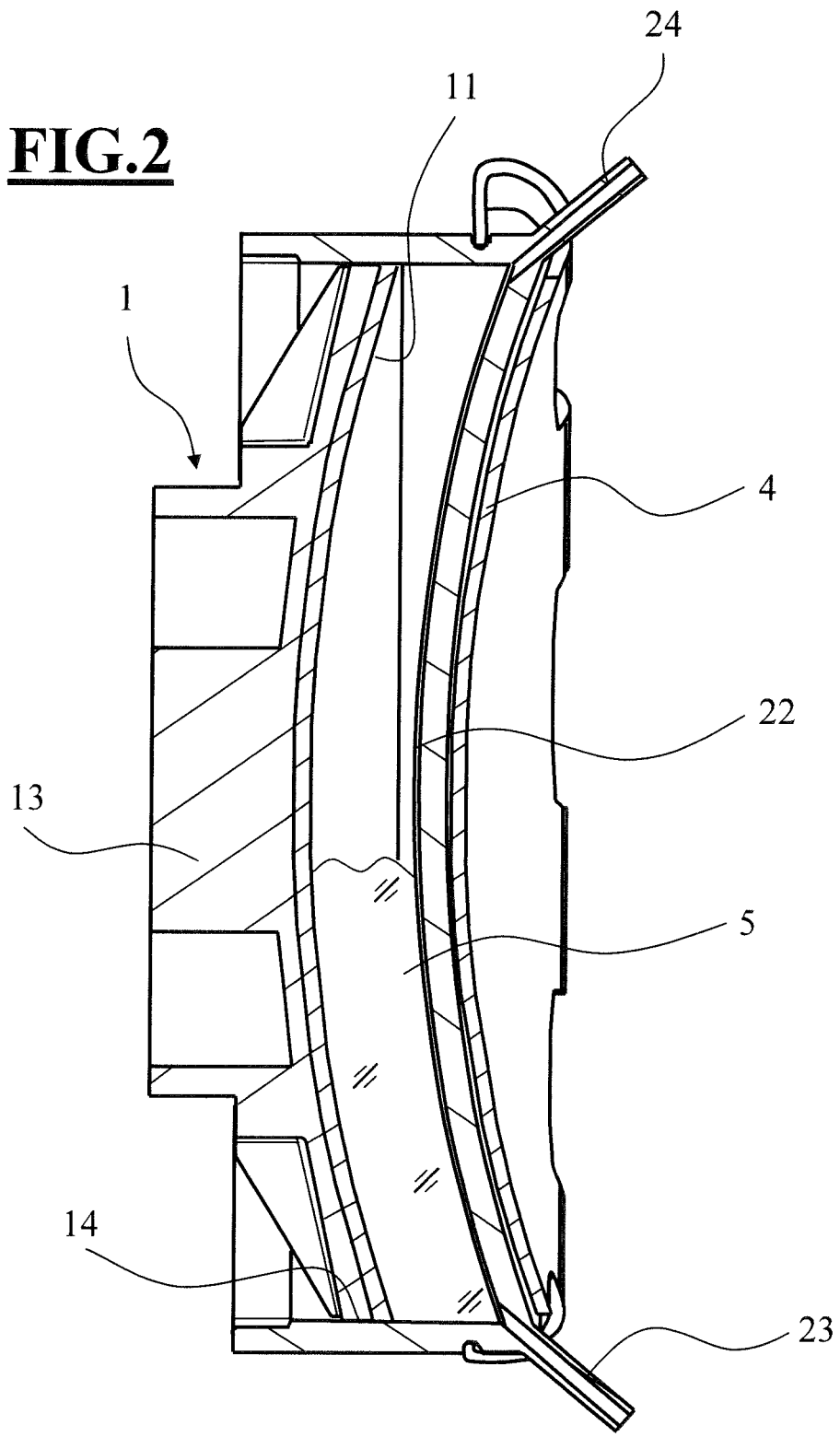
FIG. 2 shows the arrangement from FIG. 1 partially filled and with a membrane fixed by a spring clamp element.

After the mold cavity 3 has been filled, the flexible membrane 22 can be brought to the desired shape by a spring clamp element 4 shown in FIG. 2, which shape corresponds approximately to the desired final shape of the corresponding side of the spectacle lens plus a surface allowance of 0.2-5 mm. FIG. 2 shows schematically a state in which the spring clamp element 4 is already fitted and, as is indicated at 5, the mold cavity 3 is partially filled with polymerizable composition. It will be noted that this schematically depicted state does not occur in practice during normal operation, since the spring clamp element 4 is generally fitted only after complete filling and evacuation of air from the mold cavity 3.

In the illustrative embodiment of FIGS. 1 and 2, the mold 1, with its concave optical surface 12, serves for the shaping of a convex surface of a blank, this generally being the front surface of a spectacle lens. On account of the individual manufacture of the mold shell 11 by 3D printing, this front surface does not simply have to be a standard surface. Instead, it can already be adapted individually to the user of the spectacle lens. For example, it can already be an individually adapted progressive surface.

Figure 3:
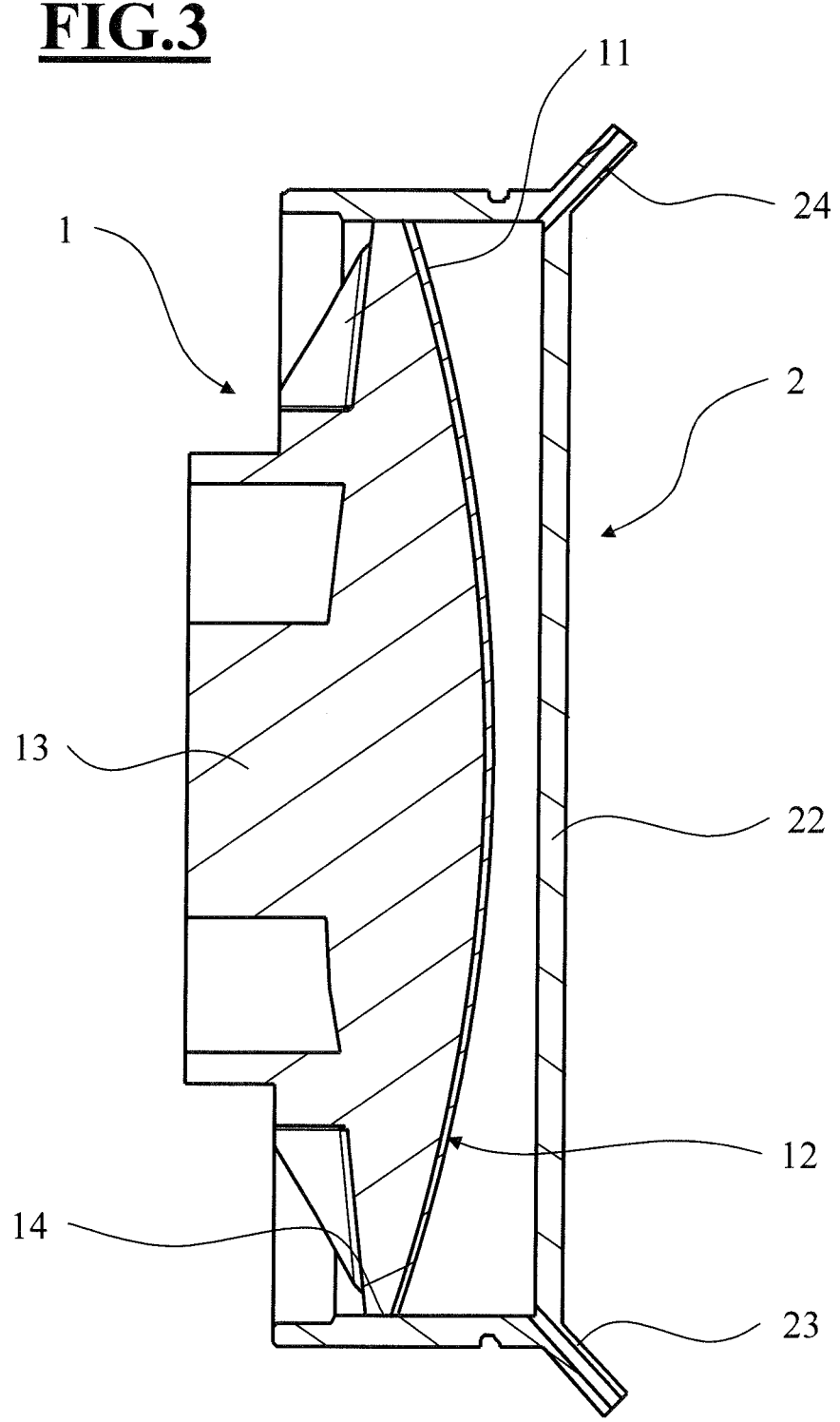
FIG. 3 shows an arrangement with a convex mold in cross section.
Figure 4:
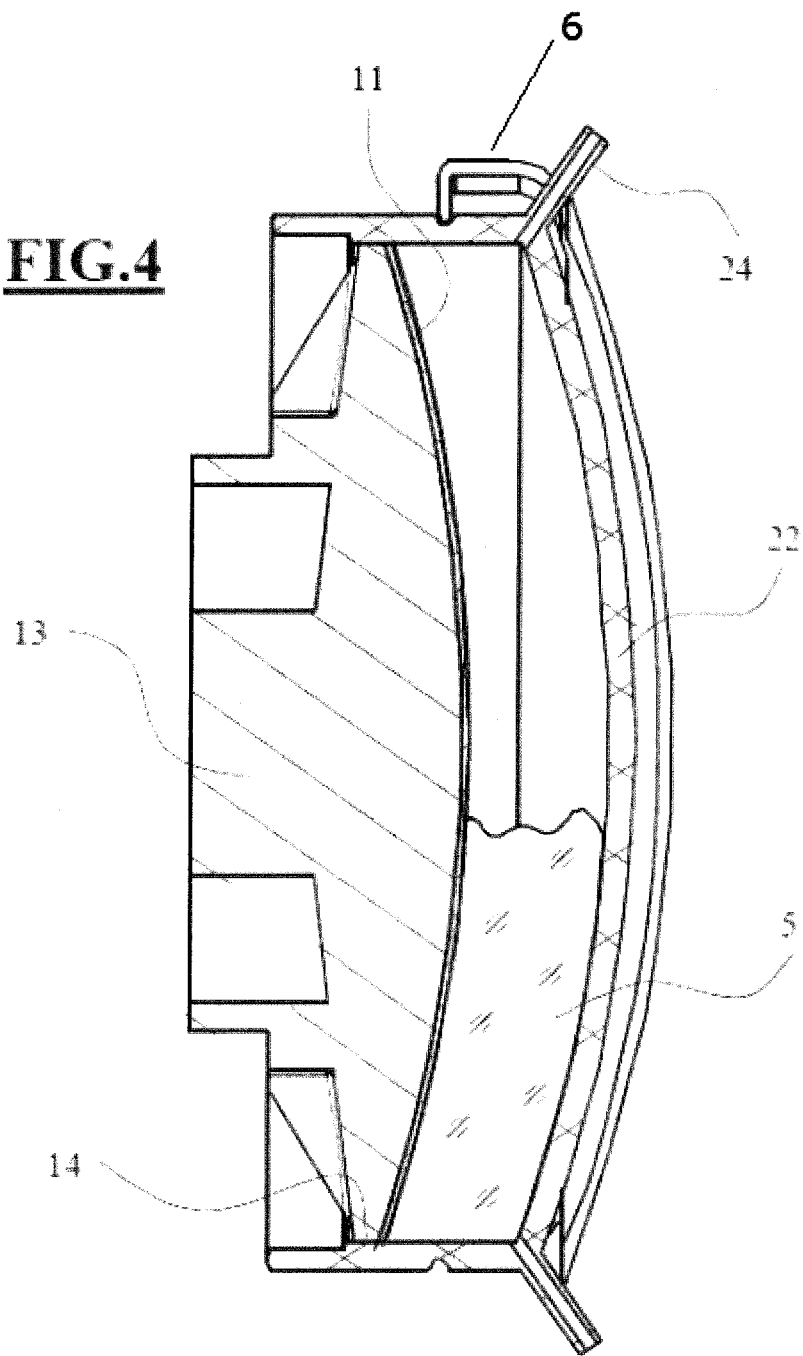
FIG. 4 shows the arrangement from FIG. 3 partially filled and with a membrane fixed by a spring clamp element; and, FIGS. 5 to 18 show schematic views of the sequence of a method according to the invention for casting a spectacle lens.

FIGS. 3 and 4 show a second embodiment of the invention. It largely corresponds to the first embodiment, except that here the mold shell 11 with the optical surface 12 is made convex in order to cast a concave surface of a spectacle lens. In this variant, this is generally the back surface of a spectacle lens.

A particular advantage of the invention is that, also in the mold 1 according to the illustrative embodiment in FIGS. 3 and 4, an identical sealing ring 2 can be used which interacts with the corresponding mold 1. As is shown in FIG. 4, the flexible membrane 22 of the sealing ring 2 can be brought by a suitably shaped spring clamp element 6 to a concave shape pointing towards the mold cavity 3, such that, in the illustrative embodiment of FIGS. 3 and 4, a convexly shaped spectacle lens is cast on the side of the flexible membrane 22. In this case also, the spectacle lens surface cast on the side of the flexible membrane 22 will generally have a surface allowance of 0.2-5 mm, in order to permit corresponding finishing in the course of the prescription grinding.

A complete sequence of the method according to the invention for production of a spectacle lens is described below with reference to FIGS. 5 to 18.

Figure 5:
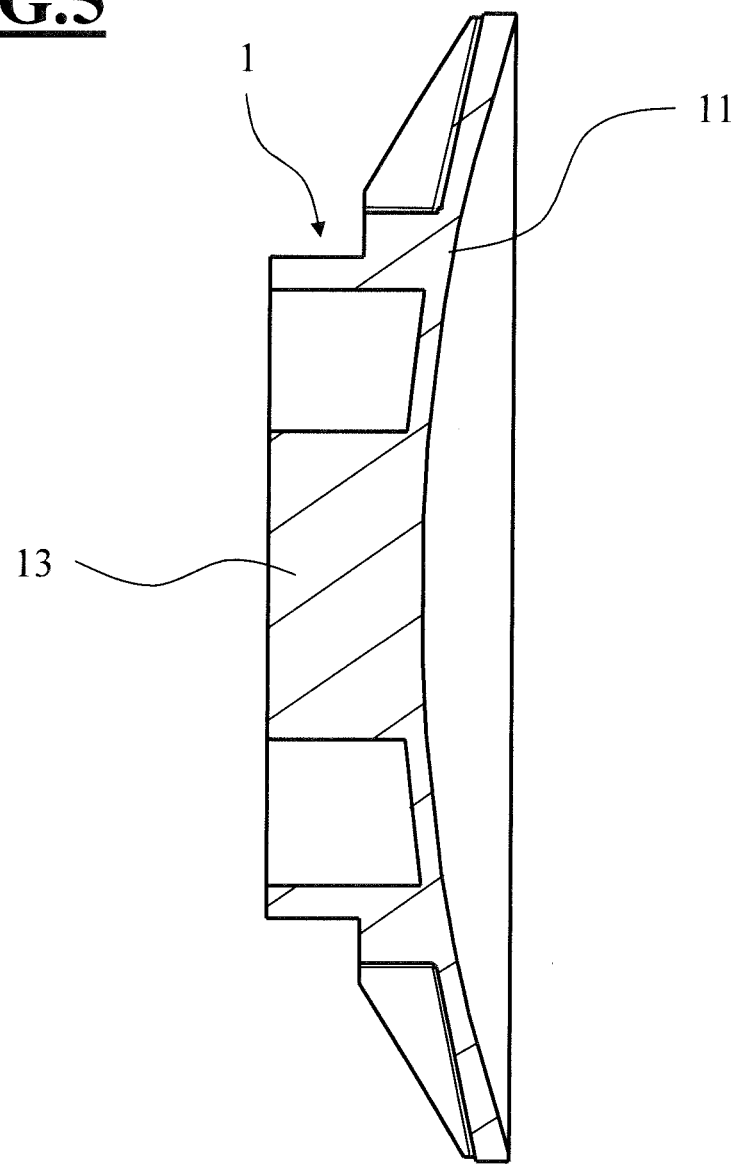

In the first step, the surface design of the mold is established, preferably taking account of individual requirements and/or prescription values. 3D files are derived from the established surface design and modelled and are transferred to a 3D printer. The complete mold 1, including the block piece 13 connected thereto, is produced by 3D printing. It is shown in FIG. 5.

Figure 6:
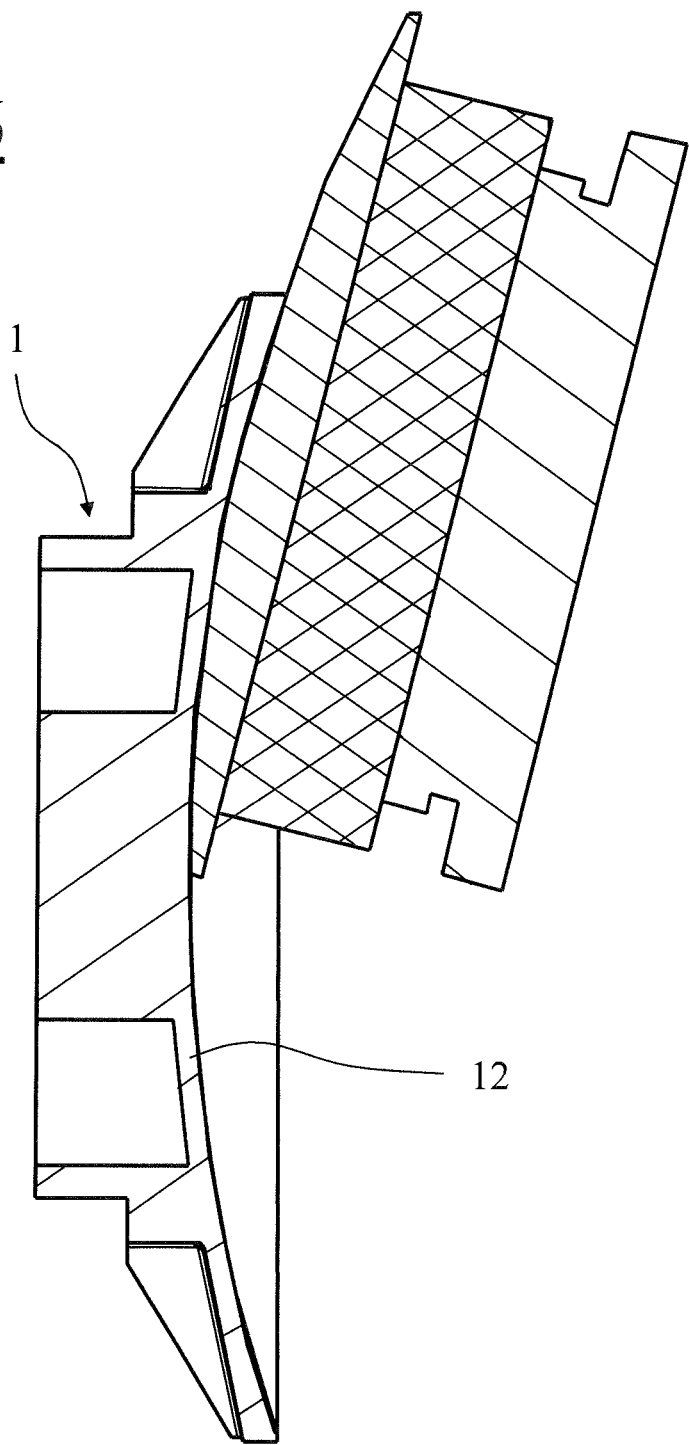

The optical surface 12 of the printed mold can be polished if required (FIG. 6). It can then be cleaned and, if appropriate, activated.

Figure 7:
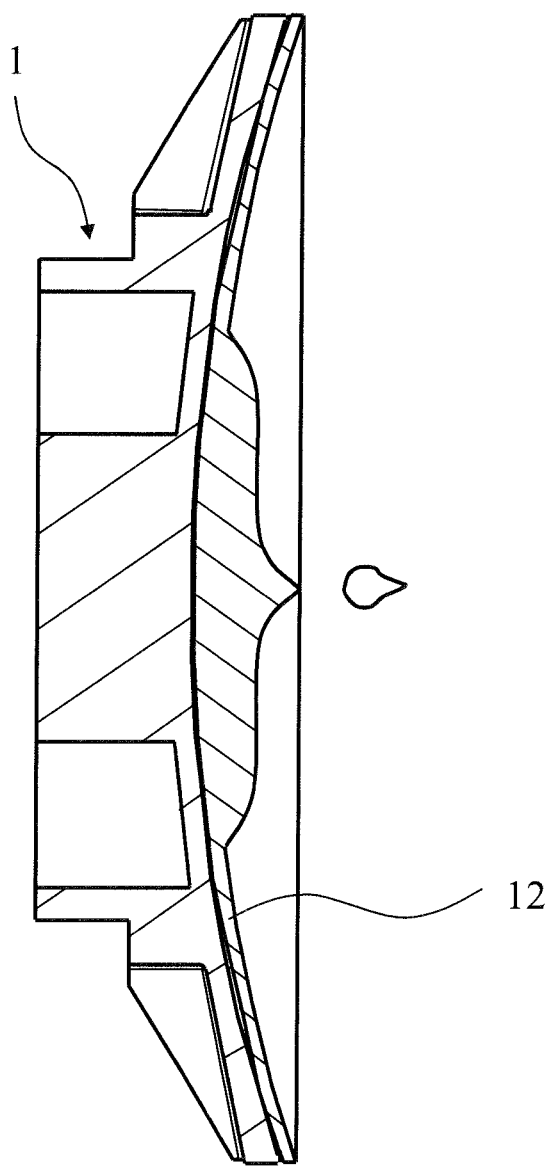

The optical surface prepared in this way is preferably coated with one or more layers applied by wet chemistry (preferably applied via spin coating technology), as shown in FIG. 7. These layers are later transferred to the blank during casting.

It is preferable, according to the invention, to precisely measure the mold surface thus produced and to store the measurement result in a database. During the subsequent prescription grinding, recourse can then be made to this measurement result.

Figure 8:
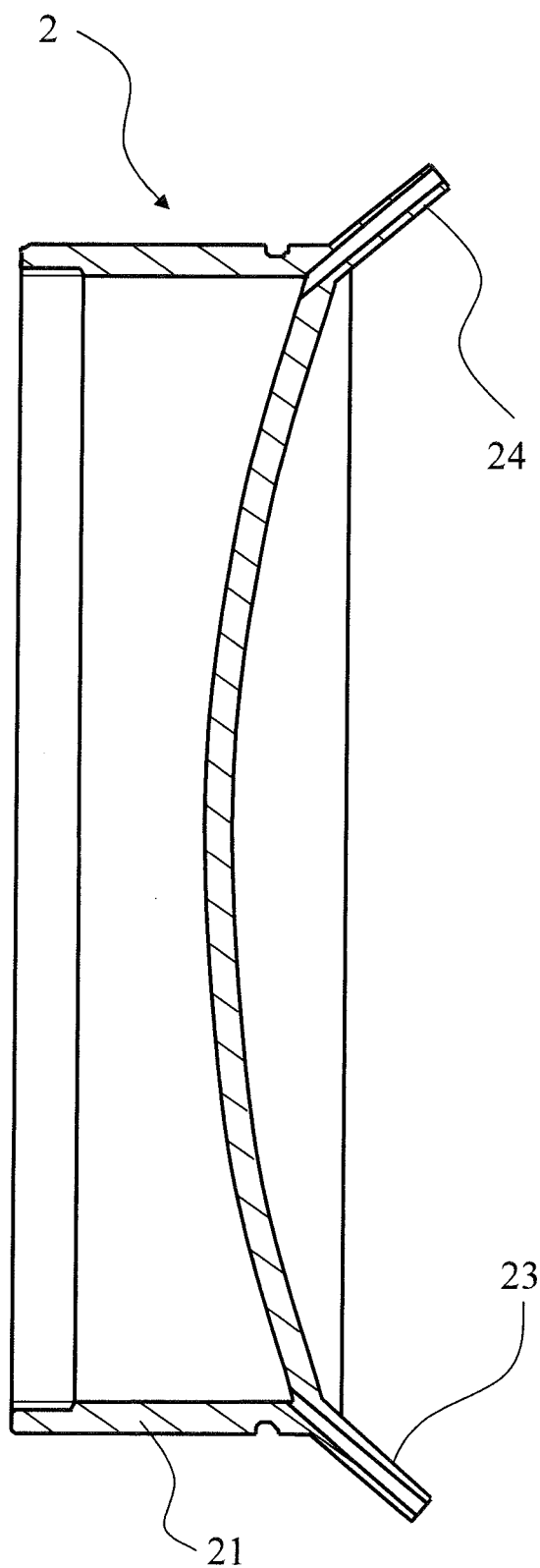
Figure 9:
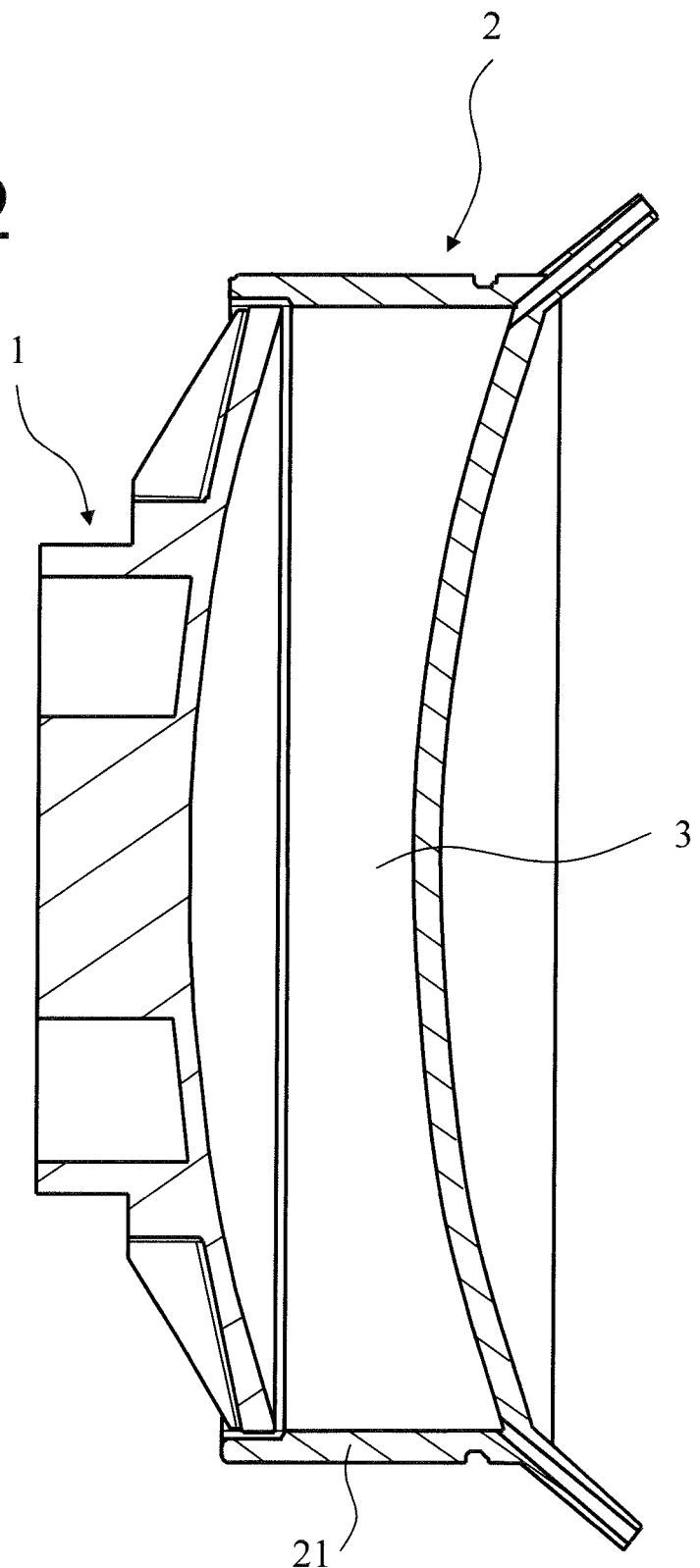
Figure 10:
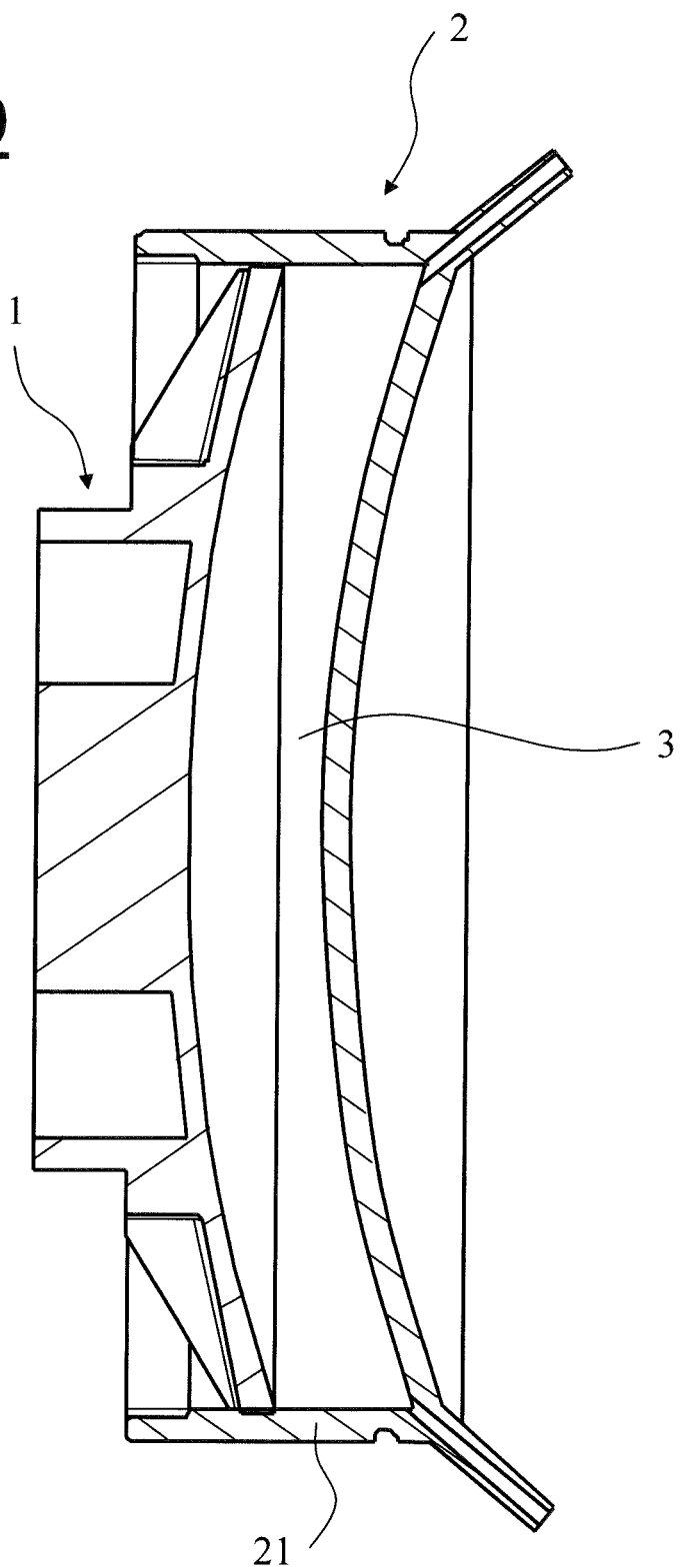

The mold that has been produced and prepared in this way is inserted into a matching sealing ring 2, which is shown in FIG. 8. Mold and sealing ring are joined axially to the required depth. As is shown in FIGS. 9 and 10, different depth dimensions can be chosen in order to cast blanks of different thicknesses.

Figure 11:
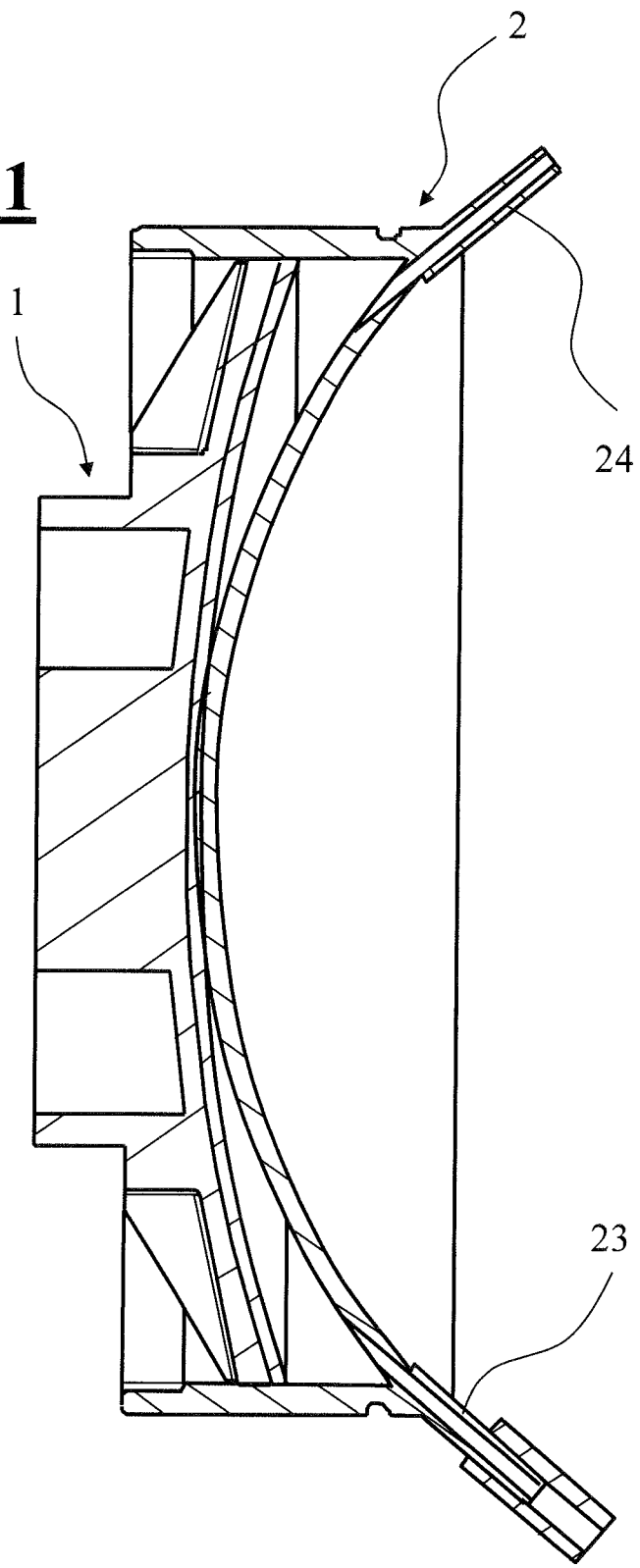
Figure 12:
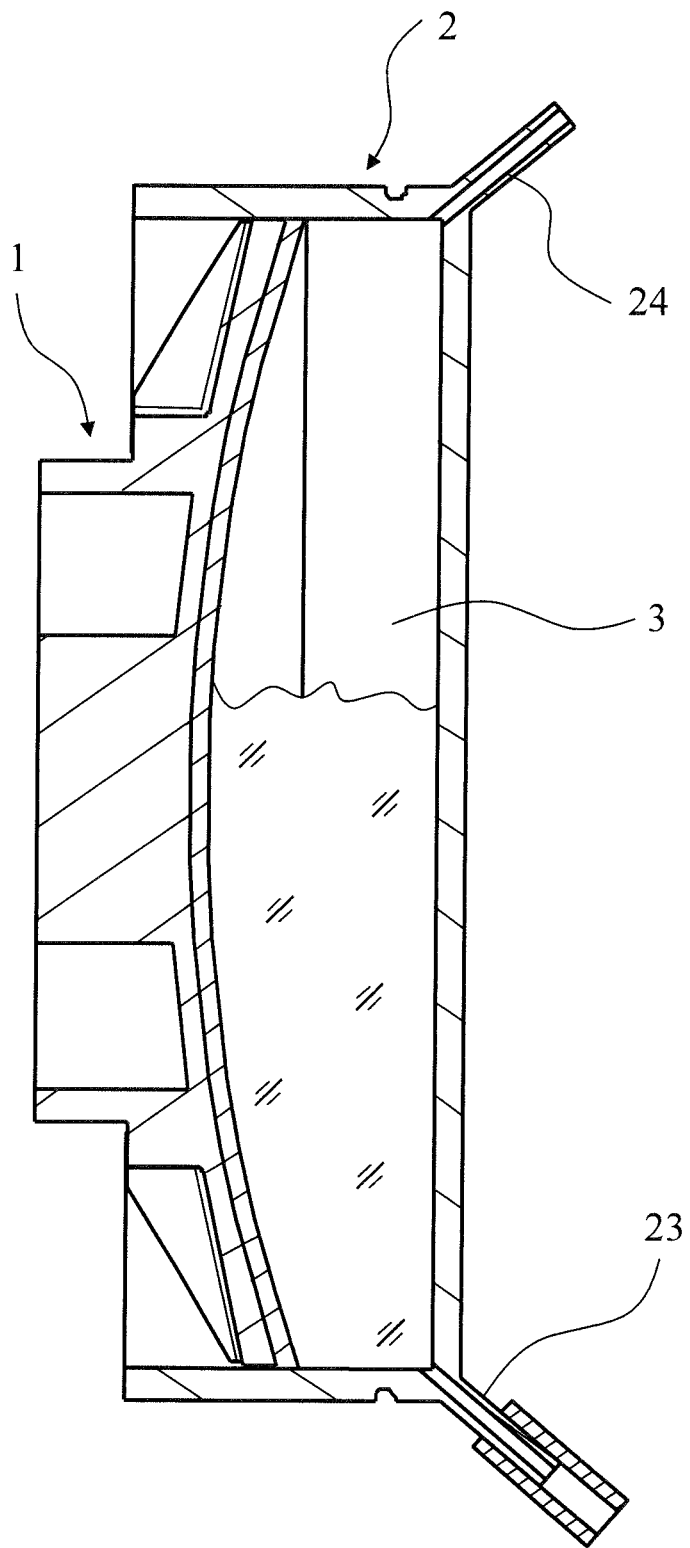
Figure 13:
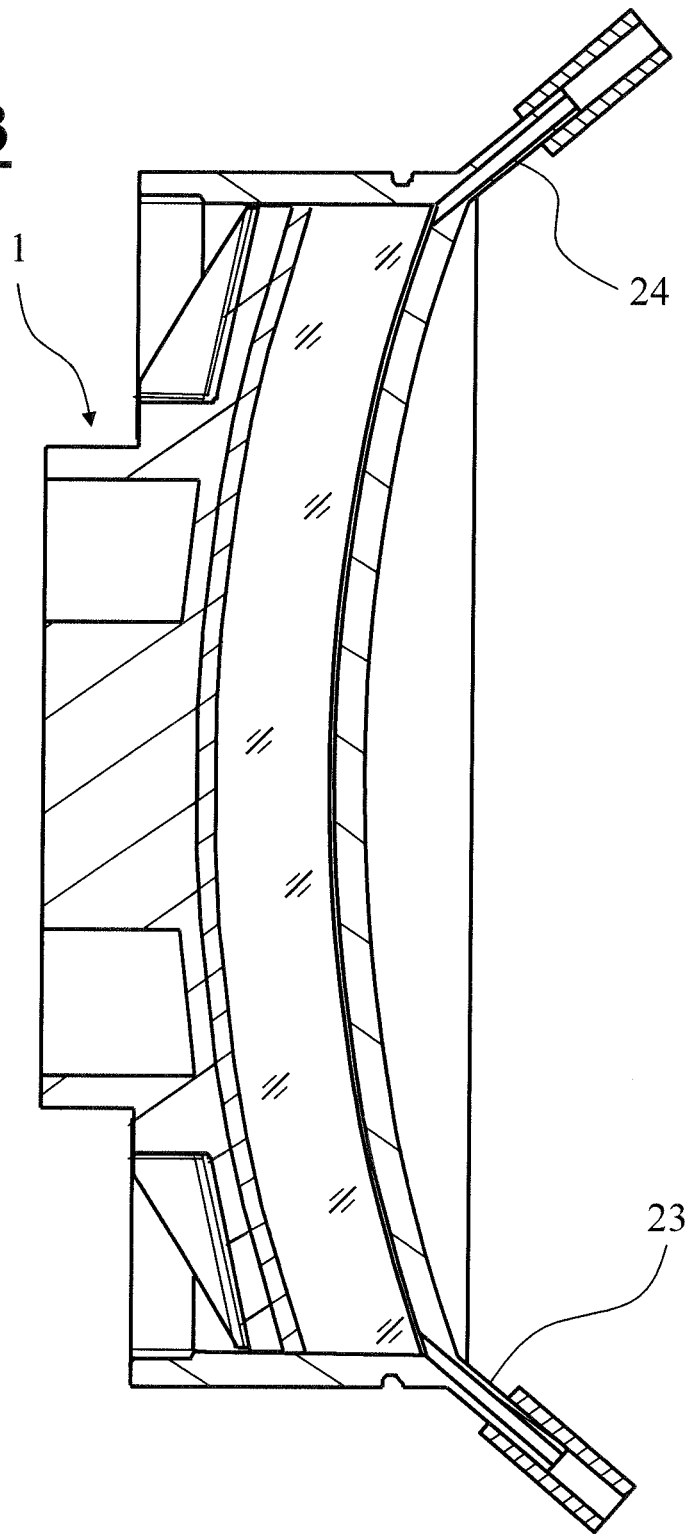

The inlet and outlet channels (23, 24) of the sealing ring 2 are connected to the monomer supply (FIG. 11). The thus prepared arrangement composed of mold and sealing ring is inserted into a pump mechanism, via which the flexible membrane can be subjected to underpressure and/or overpressure. The mold cavity 3 is firstly evacuated by pumping as far as possible, that is, the air is removed from it (FIG. 12). The mold cavity is then filled with monomer (FIGS. 12 and 13). The inlet and outlet channels provided according to the invention easily allow the filling to be carried out free of bubbles. Via the pump mechanism, sufficient underpressure can be generated, and the flexible membrane is correspondingly expanded, such that complete filling without air bubbles can take place. The outlet channel is closed only when all the air bubbles are expelled. Thereafter, the inlet channel can also be closed. The closing can be effected by clamping, as is indicated schematically at (25, 26) in FIG. 14.

Figure 14:
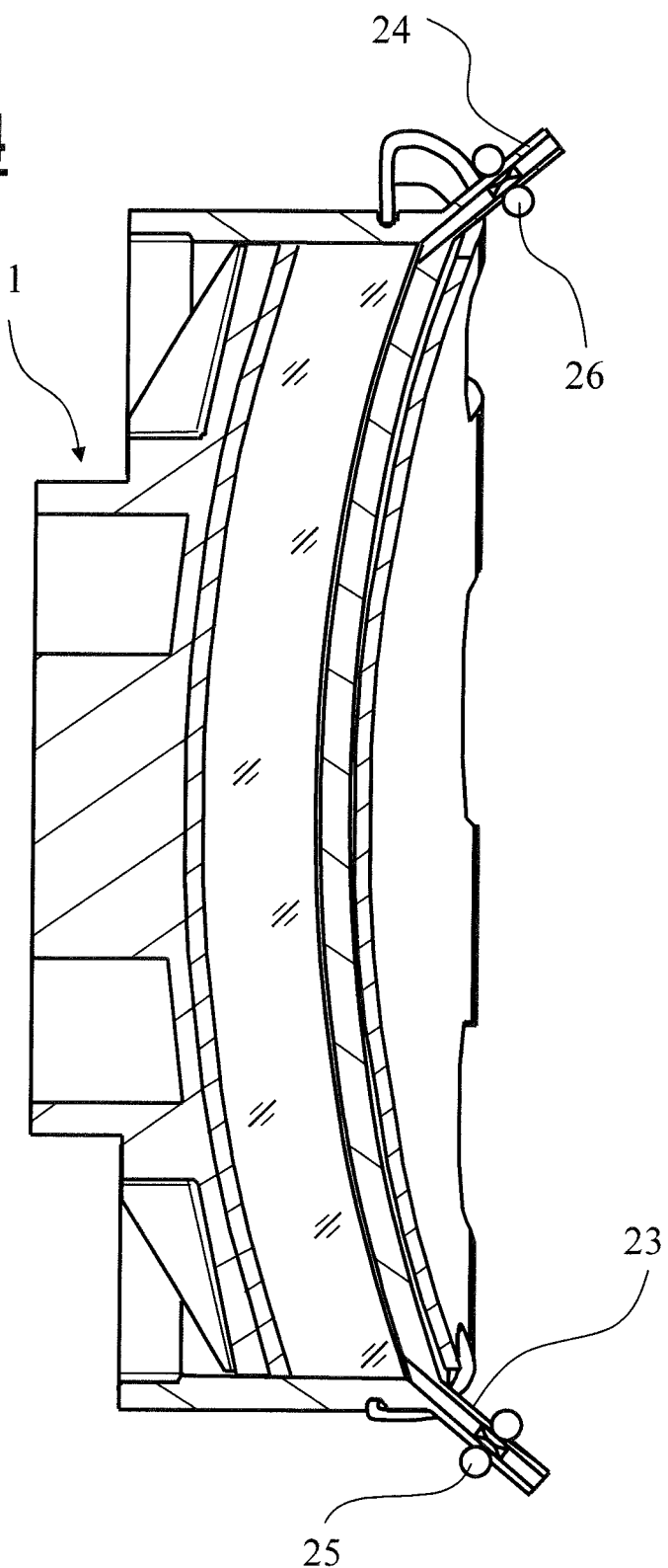

The flexible membrane is fixed in the desired shape via the spring clamp element 4 being fitted and locked in place (FIG. 14). According to the invention, the whole procedure can take place fully automatically in an inline process completely closed off from the environment, since the simple filling procedure and removal of air bubbles, made possible according to the invention, permits such automation.

Figure 15:
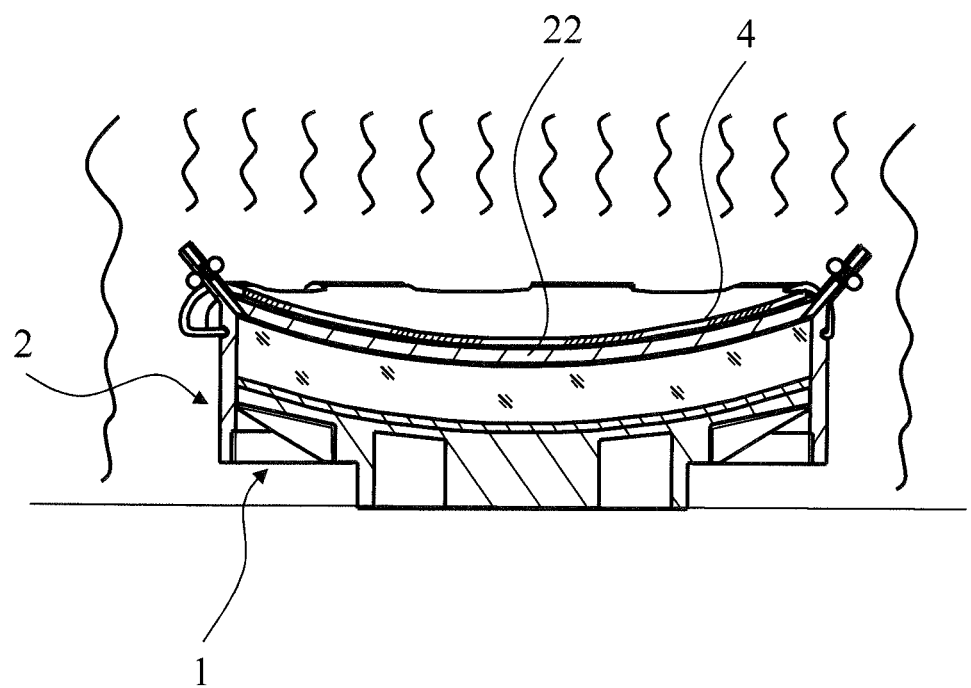
Figure 16:
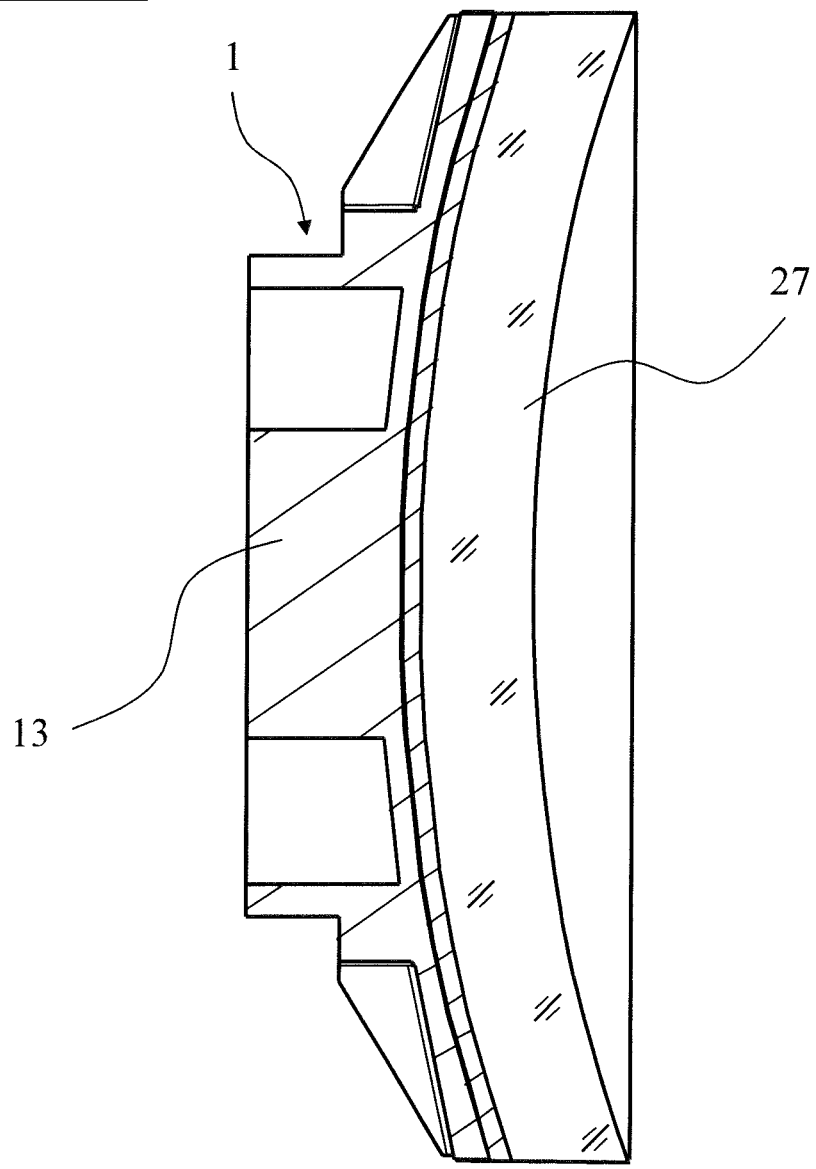

When filled, the arrangement is detached from the monomer supply and the polymerization is carried out (FIG. 15). Such a polymerization cycle can last for up to 48 hours, for example, and include cooling and heating phases.

After completion of the polymerization, the spring clamp element and the sealing ring are removed. The blank 27 remains on the mold according to the invention (FIG. 16), and the corresponding side of the blank is thus protected in the course of further machining. The blank is inspected to ensure it is clean.

Figure 17:
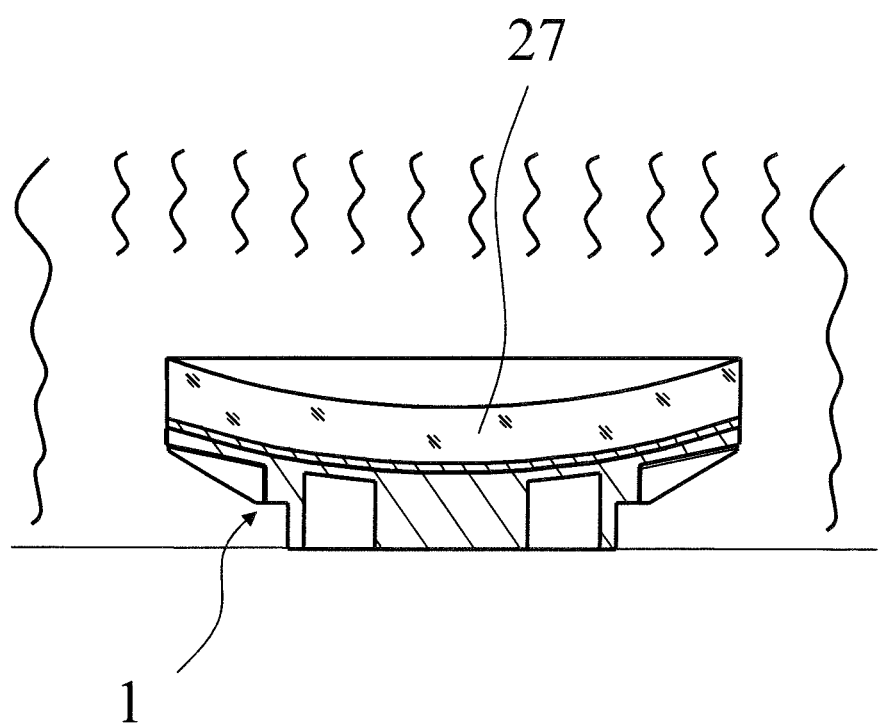

In the next step, the blank undergoes tempering free of stress (FIG. 17). During this step, it remains on the mold, which supports the entire surface of the blank and prevents deformations, even in the case of blanks that are thin at the edge or in the center. In the course of further treatment, the mold 1 and the block piece 13 of the mold serve as an interface for holding elements of machine tools or the like.

In the next step, the surface condition can be examined by suitable mechanical scanning methods or by reflection methods (for example the Dual Lensmapper from the company called Automation & Robotics). The finished blanks, along with the molds remaining on them, can be packaged and dispatched for prescription grinding.

Figure 18:
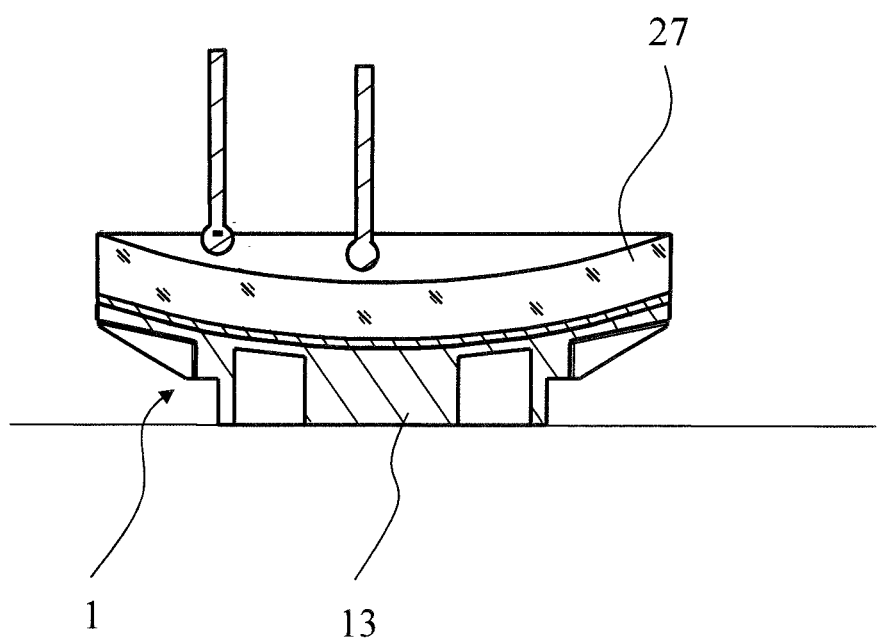

In the subsequent prescription grinding, the mold serves as block piece (FIG. 18). After completion of the prescription grinding carried out in a conventional manner, the finished spectacle lens is separated from the mold, and the latter is disposed of.

It is understood that the foregoing description is that of the preferred embodiments of the invention and that various changes and modifications may be made thereto without departing from the spirit and scope of the invention as defined in the appended claims.

What is claimed is:

1. A method for making a spectacle lens, the method comprising the steps of:
    joining a mold and a sealing ring, the mold having an integrated block piece and a mold shell made by primary shaping and the sealing ring having a first end face, a second end face, a peripheral seal, an opening disposed on the first end face configured to receive a mold, and a flexible membrane on the second end face with the sealing ring and the mold shell conjointly defining a mold cavity;
    introducing a polymerizable material into the mold cavity with the aid of a pump action of the flexible membrane of the sealing ring;
    fixing the flexible membrane of the sealing ring in a desired surface shape;
    carrying out the polymerization in the mold cavity; and,
    removing the mold with a cast-on spectacle lens blank.

2. The method of claim 1 further comprising the step of performing finishing steps for making a finished spectacle lens.

3. The method of claim 1 further comprising the step of performing prescription grinding for making a finished spectacle lens.

4. The method of claim 1, wherein said fixing the flexible membrane of the sealing ring in a desired surface shape is done via a shaping-inputting element.

5. The method of claim 4, wherein said shaping-inputting element is a spring tension element.

6. The method of claim 1 further comprising the step of performing finishing steps, at least partially, while the spectacle lens blank remains in the mold and while using the integrated block piece.

7. The method of claim 2, wherein the spectacle lens blank is made with a surface allowance of at most 10 mm.

8. The method of claim 1, wherein the spectacle lens blank is made with a surface allowance lying in a range of 0.2 to 5 mm.

9. The method of claim 2, wherein said performing finishing steps results in a material removal of at most 20%.

10. The method of claim 1, wherein the mold shell is formed by injection molding or 3D printing.

11. The method of claim 2, wherein the sealing ring has at least an inlet channel and an outlet channel for casting compositions in the region of the peripheral seal.

12. The method of claim 11, wherein the inlet/outlet channels can be squeezed shut.

13. The method of claim 11, wherein the method step of introducing a polymerizable material into the mold cavity includes:
    inserting the arrangement of the mold and the sealing ring into a pump mechanism via which the flexible membrane can be subjected to at least one of underpressure and overpressure;
    pumping out the mold cavity so as to remove air;
    filling the mold cavity with monomer by generating underpressure via the pump mechanism and stretching the flexible membrane; and,
    closing the outlet channel and the inlet channel.

14. The method of claim 11, wherein the method step of introducing a polymerizable material into the mold cavity includes:
- inserting the arrangement of the mold and the sealing ring into a pump mechanism via which the flexible membrane can be subjected to at least one of underpressure and overpressure;
- pumping out the mold cavity so as to remove air;
- filling the mold cavity with monomer by generating underpressure via the pump mechanism and stretching the flexible membrane;
- pressing out excess monomer and, if required, any air bubbles still present; and,
- closing the outlet channel and the inlet channel.

15. The method of claim 1, wherein the sealing ring is configured to receive a mold in different positions in such a manner that mold cavities having different edge heights are generated.

16. The method of claim 1, wherein the sealing ring has, on the inner circumference of the peripheral seal, an arrangement for fixing a mold in at least one defined depth dimension.

17. A method for making a spectacle lens, the method comprising the steps of:
- joining a mold and a sealing ring, the mold having an integrated block piece and a mold shell made by primary shaping and the sealing ring having a first end face, a second end face, a peripheral seal, an opening disposed on the first end face configured to receive a mold, and a flexible membrane on the second end face with the sealing ring and the mold shell conjointly defining a mold cavity;
- introducing a polymerizable material into the mold cavity with the aid of a pump action of the flexible membrane of the sealing ring;
- fixing the flexible membrane of the sealing ring in a desired surface shape;
- carrying out the polymerization in the mold cavity;
- removing the mold with a cast-on spectacle lens blank; and,
- wherein the spectacle lens blank is made with a surface allowance of at most 10 mm.

18. A method for making a spectacle lens, the method comprising the steps of:
- joining a mold and a sealing ring, the mold having an integrated block piece and a mold shell made by primary shaping and the sealing ring having a first end face, a second end face, a peripheral seal, an opening disposed on the first end face configured to receive a mold, and a flexible membrane on the second end face with the sealing ring and the mold shell conjointly defining a mold cavity and wherein the sealing ring has at least an inlet channel and an outlet channel for casting compositions in the region of the peripheral seal;
- introducing a polymerizable material into the mold cavity with the aid of a pump action of the flexible membrane of the sealing ring by:
- (i) inserting the arrangement of the mold and the sealing ring into a pump mechanism via which the flexible membrane can be subjected to at least one of underpressure and overpressure; and,
- (ii) pumping out the mold cavity so as to remove air;
- fixing the flexible membrane of the sealing ring in a desired surface shape;
- carrying out the polymerization in the mold cavity;
- removing the mold with a cast-on spectacle lens blank;
- filling the mold cavity with monomer by generating underpressure via the pump mechanism and stretching the flexible membrane;
- pressing out excess monomer and, if required, any air bubbles still present; and,
- closing the outlet channel and the inlet channel.

\* \* \* \* \*